(12) United States Patent
Holden et al.

(10) Patent No.: US 9,467,735 B2
(45) Date of Patent: Oct. 11, 2016

(54) SYNCHRONIZING DIGITAL AUDIO AND ANALOG VIDEO FROM A PORTABLE MEDIA DEVICE

(75) Inventors: Paul Holden, Sunnyvale, CA (US); Muthya Girish, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 2527 days.

(21) Appl. No.: 12/138,788

(22) Filed: Jun. 13, 2008

(65) Prior Publication Data

US 2009/0060446 A1    Mar. 5, 2009

Related U.S. Application Data

(60) Provisional application No. 60/969,945, filed on Sep. 4, 2007.

(51) Int. Cl.
| | |
|---|---|
| H04N 5/91 | (2006.01) |
| H04N 21/434 | (2011.01) |
| H04N 5/765 | (2006.01) |
| H04N 21/2368 | (2011.01) |
| H04N 21/41 | (2011.01) |

(Continued)

(52) U.S. Cl.
CPC .......... *H04N 21/4341* (2013.01); *H04N 5/765* (2013.01); *H04N 21/2368* (2013.01); *H04N 21/4126* (2013.01); *H04N 21/4135* (2013.01); *H04N 21/436* (2013.01); *H04N 21/4307* (2013.01); *H04N 21/8106* (2013.01); *H04N 5/85* (2013.01); *H04N 5/907* (2013.01); *H04N 9/8205* (2013.01)

(58) Field of Classification Search
USPC ...................... 386/96, 104; 700/94
See application file for complete search history.

(56) References Cited

U.S. PATENT DOCUMENTS

| | | |
|---|---|---|
| 5,592,588 A | 1/1997 | Reekes et al. |
| 6,012,105 A | 1/2000 | Rubbmark et al. |

(Continued)

FOREIGN PATENT DOCUMENTS

| | | |
|---|---|---|
| DE | 102004017215 A1 | 10/2005 |
| EP | 1259082 A2 | 11/2002 |

(Continued)

OTHER PUBLICATIONS

"The HAVi Specification. Version 1.1—Chapter 2: Overview," Internet Citation, [Online] May 15, 2001, pp. 8-24, XP007905336. Retrieved from the Internet: URL:http://www.havi.org/HAVI_1.1.pdf>[retrieved on Jul. 31, 2008].

(Continued)

*Primary Examiner* — Jeffrey Pwu
*Assistant Examiner* — Helai Salehi
(74) *Attorney, Agent, or Firm* — Kilpatrick Townsend & Stockton, LLP (57) ABSTRACT

A portable media device (PMD) can produce an isochronous audio/video experience when the PMD provides a digital audio signal to the accessory while displaying analog video on an accessory-independent display. The accessory can communicate audio latency information to the PMD. The PMD can delay a video portion of a presentation, relative to providing the digital audio signal to the accessory, based on the audio latency information communicated by the accessory. As a result, the user may perceive an isochronous presentation of the audio and video portions of the presentation.

16 Claims, 4 Drawing Sheets

(51) Int. Cl.
*H04N 21/43* (2011.01)
*H04N 21/436* (2011.01)
*H04N 21/81* (2011.01)
*H04N 5/85* (2006.01)
*H04N 5/907* (2006.01)
*H04N 9/82* (2006.01)

(56) References Cited

U.S. PATENT DOCUMENTS

| | | | |
|---|---|---|---|
| 6,373,855 B1* | 4/2002 | Downing et al. | 370/468 |
| 6,558,201 B1 | 5/2003 | Begley et al. | |
| 6,774,939 B1 | 8/2004 | Peng | |
| 6,859,538 B1 | 2/2005 | Voltz | |
| 7,084,898 B1* | 8/2006 | Firestone et al. | 348/14.09 |
| 7,167,112 B2 | 1/2007 | Andersen et al. | |
| 7,293,122 B1 | 11/2007 | Schubert et al. | |
| 7,299,304 B2 | 11/2007 | Saint-Hilaire et al. | |
| 7,303,282 B2 | 12/2007 | Dwyer et al. | |
| 7,471,337 B2* | 12/2008 | Wells et al. | 348/515 |
| 7,602,813 B2* | 10/2009 | Yabuta et al. | 370/503 |
| 7,817,557 B2* | 10/2010 | Woodworth | 370/236 |
| 2002/0174269 A1 | 11/2002 | Spurgat et al. | |
| 2003/0079038 A1 | 4/2003 | Robbin et al. | |
| 2003/0172209 A1 | 9/2003 | Liu et al. | |
| 2004/0048569 A1 | 3/2004 | Kawamura | |
| 2004/0224638 A1 | 11/2004 | Fadell et al. | |
| 2004/0252966 A1 | 12/2004 | Holloway et al. | |
| 2005/0240705 A1 | 10/2005 | Novotney et al. | |
| 2007/0038999 A1* | 2/2007 | Millington | 718/100 |
| 2007/0056013 A1 | 3/2007 | Duncan | |
| 2007/0086724 A1 | 4/2007 | Grady et al. | |
| 2007/0153815 A1* | 7/2007 | She et al. | 370/401 |
| 2007/0226384 A1 | 9/2007 | Robbin et al. | |

FOREIGN PATENT DOCUMENTS

| | | |
|---|---|---|
| EP | 1367734 A1 | 12/2003 |
| EP | 1594319 A1 | 11/2005 |
| EP | 1672613 A2 | 6/2006 |
| EP | 2046062 A2 | 4/2009 |
| JP | 03092088 A | 4/1991 |
| JP | 03125580 A | 5/1991 |
| JP | 3125580 A | 5/1991 |
| JP | 07162806 A | 6/1995 |
| JP | 2002/315099 A | 10/2002 |
| WO | WO 01/21340 A2 | 7/2001 |
| WO | WO 01/51340 * | 7/2001 |
| WO | WO 01/51340 A2 | 7/2001 |
| WO | WO 01/51340 A3 | 7/2001 |
| WO | WO 02/49314 A2 | 6/2002 |

OTHER PUBLICATIONS

"The HAVi Specification. Version 1.1—Chapter 6: APIs for Functional Component Modules," Internet Citation, [Online] May 15, 2001, pp. 296-392, XP007905340. Retrieved from the Internet: URL:http://www.havi.org/HAVI_1.1.pdf> [retrieved on Jul. 31, 2008].
International Search Report PCT/US2008/072988 dated Dec. 15, 2008.
Search Report for application GB0815172.2 dated Dec. 15, 2008.
Crawford et al., "Sample rate conversion and bit rate reduction in the studio," IEEE Colloquium on Digital Audio Signal Processing, May 22, 1991, pp. 8/1-8/3.
"Future of Digital Music in Windows," Microsoft Windows Hardware Developer Central Archive, Dec. 4, 2001 [Online], [retrieved on Jan. 15, 2008]. <URL:http://www.microsoft.com/whdc/archive/digitaudio.mspx>, 3 pages.
"Introduction to Digital Audio," Microsoft Windows Hardware Developer Central Archive, Dec. 4, 2001 [Online], [retrieved on Jan. 15, 2008]. <URL:http://www.microsoft.com/whdc/archive/digitaudio.mspx> 2 pages.
Lambert, "Digital Audio Interfaces," Journal of the Audio Engineering Society, Audio Engineering Society, New York, NY, vol. 38, No. 9, (Sep. 1, 1990), pp. 681-684, 686, 688, 690, 692 and 696, XP000175146 ISSN: 1549-4950 figures 9, 10.
"Windows and Red Book Audio," Microsoft Windows Hardware Developer Central Archive, Dec. 4, 2001 [Online], [retrieved Jan. 15, 2008]. <URL:http://www.microsoft.com/whdc/archive/Dmfuture.mspx> 2 pages.
Office Action and Examination Report of Nov. 11, 2009 for patent application No. GB0815172.2, 2 pages.

* cited by examiner

FIG. 4

SYNCHRONIZING DIGITAL AUDIO AND ANALOG VIDEO FROM A PORTABLE MEDIA DEVICE

CROSS-REFERENCES TO RELATED APPLICATIONS

This application claims the benefit of U.S. Provisional Patent Application No. 60/969,945 entitled "Synchronizing USB Digital Audio And Analog Video", filed Sep. 4, 2007, which disclosure is incorporated herein by reference in its entirety.

This application is related to commonly assigned U.S. patent application Ser. No. 11/768,897, entitled "METHOD AND SYSTEM FOR ALLOWING A MEDIA PLAYER TO TRANSFER DIGITAL AUDIO TO AN ACCESSORY," filed Jun. 26, 2007, which disclosure is incorporated herein by reference in its entirety.

FIELD OF THE INVENTION

The present invention relates generally to media devices capable of playing video assets and in particular to synchronization of digital audio and analog video output from a portable media device.

BACKGROUND OF THE INVENTION

A portable media device can store media assets, such as audio tracks, video tracks or photos that may be played or displayed on the portable media device. Examples of portable media devices are the iPod™ and the iPhone™ portable media devices, which are available from Apple Inc. of Cupertino, Calif., assignee of the present application. A portable media device can acquire media assets, e.g., from a host computer that also serves to enable a user to manage media assets stored on the host computer and/or the portable media device. As an example, the host computer may execute a media management application to manage media assets. One example of a media management application is iTunes®, produced by Apple Inc.

A portable media device typically includes one or more connectors or ports that may be used to interface with other remote devices. For example, the connector or port may enable the portable media device to couple to a host computer, be inserted into a docking system, or receive an accessory device. In the case of the iPod™, for example, a vast array of accessory devices have been developed that may interconnect to the portable media device. For example, an accessory that may be connected to the connector or port can receive commands from a remote control device (e.g., using infrared or other wireless signaling techniques) and send corresponding commands via the connector or port to the portable media device, thereby allowing the user to remotely control the portable media device. As another example, an automobile may include a connector, and the portable media device may be inserted onto the connector such that an automobile media system may interact with the portable media device, thereby allowing the media content on the portable media device to be played using the automobile media system. In another example, a digital camera may be connected to the portable media device to download images and the like.

Portable media devices commonly connect with accessory devices for playback or presentation of tracks stored on the portable media device. A user may want to dock a portable media device to an audio amplification system such as, for example, a home stereo system and play back a video presentation stored on the portable media device. The user desires to experience a video display on the portable media device but have an audio experience provided by the home stereo system. The user expects an isochronous experience, where the audio portion of the presentation is synchronized with the video portion. However, each instance of an audio amplification system may propagate a digital audio input with different delay characteristics, and the delay characteristics may vary depending on characteristics (such as sampling rate) of the digital audio input. Many existing audio/video presentation systems require extensive user interaction in a setup process to interactively input to the system the user's perception of delay between video and audio in response to test signals, allowing the system to compensate for delay. Such setup processes are time consuming and are usually imprecise.

It would therefore be desirable to provide an isochronous audio and video presentation without requiring extensive user interaction.

BRIEF SUMMARY OF THE INVENTION

Embodiments of the present invention relate to synchronization of digital audio output with analog video output from a portable media device ("PMD"). In one embodiment, the PMD can provide information about the digital audio output (e.g., sampling rate) to an accessory that is configured receive the digital audio output and convert it for presentation to a user. The accessory can determine an audio latency time based at least in part on the information provided by the PMD and can provide the audio latency information to the PMD. The audio latency information can include any information pertaining to the audio processing latency of the accessory, including latency related to buffering, decoding, internal signal processing (e.g., equalization), conversion to analog audio, and so on. The audio latency for an accessory receiving a particular type of digital audio signal can be determined, e.g., by testing and/or simulation of the accessory's internal electronics. Once the accessory has provided the audio latency information, the PMD can then synchronize the analog video output (e.g., to its own built-in display) with the accessory's analog audio output by delivering the digital audio signal to the accessory and delaying the corresponding video output for a time determined from the audio latency information. The user can then experience the audio and video portions of a presentation isochronously, without having to manually configure the timing.

One aspect of the present invention relates to a method of presenting an audio/video track using a portable media device and an accessory device. The portable media device can receive from the accessory device audio latency information and can determine a video delay time based on the audio latency information The portable media device can send digital audio data to the accessory, where the digital audio data corresponds to an audio portion of the audio/video track. The portable media device can also provide an analog video signal to a video display, where the analog video signal corresponds to a video portion of the audio/video track; providing of the analog video signal can be delayed, relative to the digital audio signal, by the video delay time.

Another aspect of the invention relates to a method of presenting an audio/video track using a portable media device and an accessory device. The accessory device can receive from the portable media device a sample rate for digital audio data corresponding to an audio portion of an audio/video track. Based at least in part on the sample rate, the accessory can determine an audio latency parameter value and can sending the audio latency parameter value to the portable media device, allowing the portable media device to use the audio latency parameter to determine a delay time for a video portion of the audio/video track. The accessory can receive the digital audio data corresponding to the audio portion of the audio/video track from the portable media device and can processing the digital audio data to produce an analog audio signal, where processing of the digital audio data can occur with a latency corresponding to the audio latency parameter value. The accessory can deliver the analog audio signal to a speaker.

Another aspect of the present invention relates to a method of synchronizing a video presentation on a portable media device with a corresponding audio presentation on an accessory device. An audio latency characteristic for a digital audio signal propagating through the accessory device is determined, and audio latency information corresponding to the audio latency characteristic is stored in the accessory device. When a portable media device is coupled to the accessory device, the accessory device can provide the audio latency information to the portable media device, allowing the portable media device to determine a video delay time that will result in audio/video synchronization.

Another aspect of the invention relates to a method of synchronizing a video presentation on a portable media device with a corresponding audio presentation on an audio accessory device. When the portable mobile device is coupled to the audio accessory device, the audio accessory device can send to the portable media device a command providing an audio latency parameter for the audio accessory device. The portable media device can provide digital audio data for the audio presentation to the audio accessory device and can delay presentation of the video presentation by an amount of time determined from the audio latency parameter.

Another aspect of the invention relates to an accessory for use with a portable media device. The accessory can include an audio processing path, an interface, and a controller coupled to the interface and to the audio processing path. The audio processing path can be configured to produce an analog audio signal from a digital audio signal. The interface can be configured to communicate with a portable media device; in particular the interface can be configured to receive a digital audio signal from the portable media device and also configured to exchange with the portable media device commands and information related to the presentation of digital audio data. The controller can be configured to send a first command to the portable media device via the interface, the first command providing to the portable media device audio latency information corresponding to a latency characteristic of the audio processing path; to receive digital audio data from the portable media device via the interface; and to deliver the digital audio data to the audio processing path.

Another aspect of the present invention relates to a portable media device for use with an accessory. The portable media device can include a video path, an interface, and a processor coupled to the interface and to the video path. The video path can be configured to produce an analog video signal. The interface can be configured to communicate with an accessory; in particular the interface can be configured to send a digital audio signal to the accessory and also configured to exchange with the accessory device commands and information related to the presentation of digital audio data. The processor can be configured to receive a first command from the accessory via the interface, the first command providing to the portable media device audio latency information corresponding to a latency characteristic of the accessory; to determine a video delay time for a video portion of an audio/video track based on the audio latency information; to send digital audio data for an audio portion of the audio/video track to the accessory via the interface; and to deliver the video portion of the audio/video track to the video path, with the delivery of the video portion being delayed, relative to sending the digital audio data to the accessory, by the video delay time.

The following detailed description together with the accompanying drawings will provide a better understanding of the nature and advantages of the present invention.

DETAILED DESCRIPTION OF THE INVENTION

Embodiments of the present invention relate to synchronization of digital audio output with analog video output from a portable media device ("PMD"). In one embodiment, the PMD can provide information about the digital audio output (e.g., sampling rate) to an accessory that is configured receive the digital audio output and convert it for presentation to a user. The accessory can determine an audio latency time based at least in part on the information provided by the PMD and can provide the audio latency information to the PMD. The audio latency information can include any information pertaining to the audio processing latency of the accessory, including latency related to buffering, decoding, internal signal processing (e.g., equalization), conversion to analog audio, and so on. The audio latency for an accessory receiving a particular type of digital audio signal can be determined, e.g., by testing and/or simulation of the accessory's internal electronics. Once the accessory has provided the audio latency information, the PMD can then synchronize the analog video output (e.g., to its own built-in display) with the accessory's analog audio output by delivering the digital audio signal to the accessory and delaying the corresponding video output for a time determined from the audio latency information. The user can then experience the audio and video portions of a presentation isochronously, without having to manually configure the timing.

Portable Media Device and Audio Accessory

Figure 1:
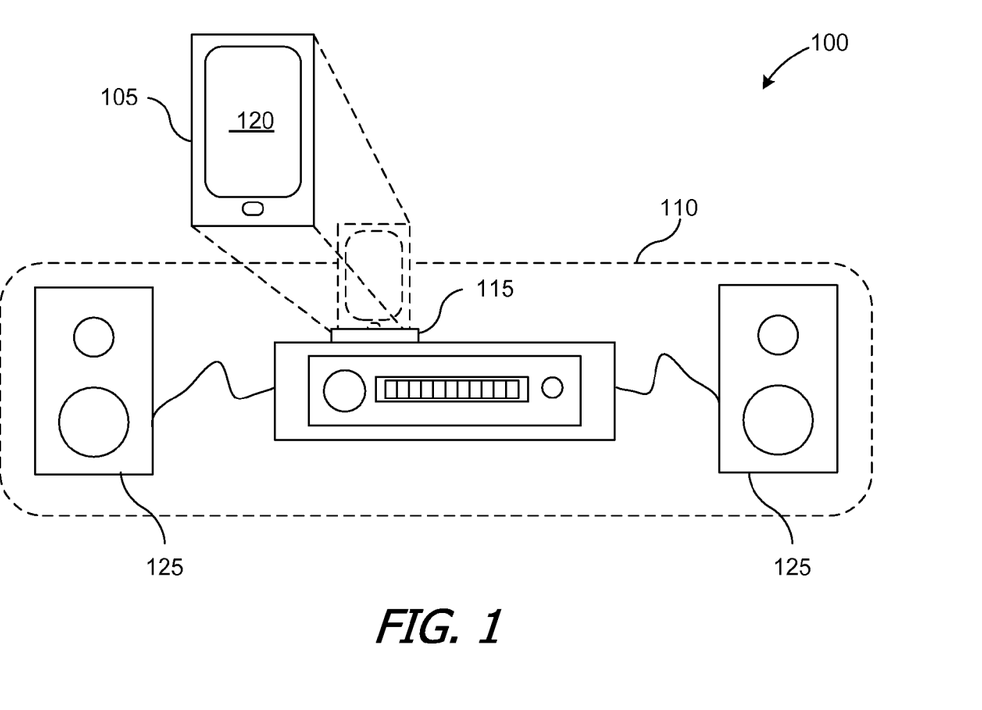
FIG. 1 illustrates a video presentation system according to an embodiment of the present invention.

FIG. 1 illustrates video presentation system 100 according to an embodiment of the present invention. PMD 105 can be coupled to accessory 110 through interface 115. Accessory 110 may be, for example, a home stereo system. Interface 115 may incorporate, for example, a Universal Serial Bus ("USB") interface. PMD 105 includes display 120 that can display video images. In accordance with an embodiment of the present invention, the user can experience an audio/video media track stored on PMD 105 using system 100. The video can be presented on display 120 of PMD 105 while the audio is presented via speakers 125 of accessory 110. Using audio latency information obtained from accessory 110, PMD 105 automatically coordinates the video presentation on display 120 with delivery of a digital audio signal to accessory 110 such that the user experiences the audio and video portions of the track isochronously with each other.

Figure 2:
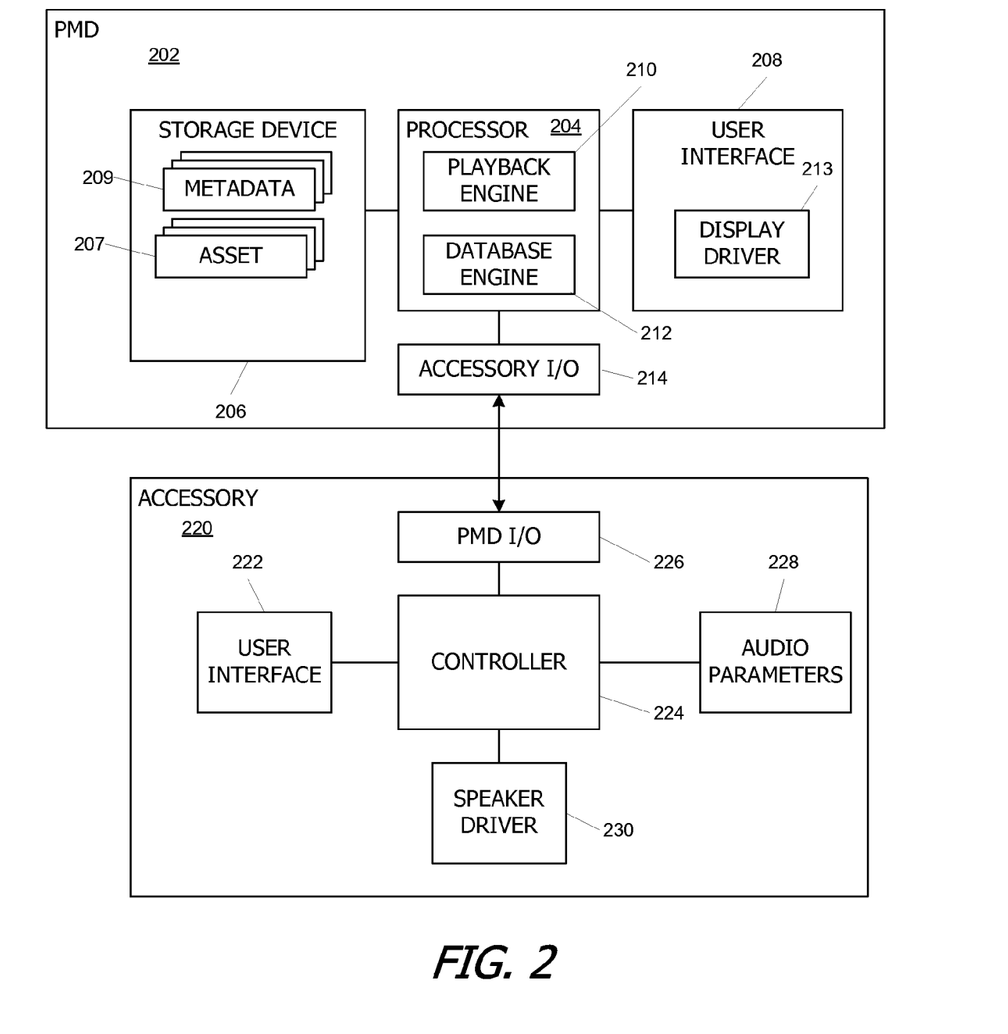
FIG. 2 is a block diagram of a system including a portable media device and accessory according to an embodiment of the present invention.

FIG. 2 is a block diagram of system 200 according to an embodiment of the present invention. System 200 can include PMD 202 (e.g., implementing PMD 105 of FIG. 1) and accessory 220 (e.g., implementing accessory 110 of FIG. 1).

PMD 202 in this embodiment can provide media player capability. PMD 202 can include processor 204, storage device 206, user interface 208, and accessory input/output (I/O) interface 214. Processor 204 in this embodiment can implement playback engine 210 and database engine 212, e.g., as software programs executed by processor 204.

Storage device 206 may be implemented, e.g., using disk, flash memory, or any other non-volatile storage medium. In some embodiments, storage device 206 can store media assets 207 (also referred to herein as "tracks"), including audio/video tracks that include both audio and video portions. Storage device 206 can implement a database that stores media assets 207 and also stores metadata records 209 associated with each media asset 207. The metadata record 209 for a given asset can include various fields, e.g., an asset title; a name of an artist or performer associated with the asset; and so on. Storage device 206 can also store one or more programs to be executed by processor 204 (e.g., video game programs, personal information management programs, programs implementing playback engine 210 and/or database engine 212, etc.).

User interface 208 may include input controls such as a touch pad, touch screen, scroll wheel, click wheel, dial, button, keypad, microphone, or the like, as well as output devices such as video screen, indicator lights, speakers, headphone jacks or the like, together with supporting electronics (e.g., digital-to-analog or analog-to-digital converters, signal processors or the like). A user can operate the various input controls of user interface 208 to invoke the functionality of PMD 202 and can view and/or hear output from PMD 202 via user interface 208. User interface 208 can also include display driver 213, which can receive analog video signals from playback engine 210 and provide corresponding output images on a display device such as integrated display screen 120 of FIG. 1.

Processor 204, which can be implemented as one or more integrated circuits (e.g., a conventional microprocessor or microcontroller), can control the operation of PMD 202. For example, in response to user input signals provided by user interface 208, processor 204 can operate database engine 212 to navigate a database of assets 207 stored in storage device 206 in response to user input and can display lists of selected assets 207 using some or all of the associated metadata 209 to identify each selected asset 207. Processor 204 can respond to user selection of an asset 207 by transferring asset information to playback engine 210. Playback engine 210 can then play the selected asset 207.

Accessory I/O interface 214 can allow PMD 202 to communicate with various accessories to exchange control information and to stream digital audio data to suitably configured accessories. For example, accessory I/O interface 214 might support connections to an external speaker dock, a radio (e.g., FM, AM and/or satellite) tuner, a home entertainment system, or the like. In one embodiment, accessory I/O interface 214 includes a 30-pin connector corresponding to the connector used on iPod™ products manufactured and sold by Apple Inc. Alternatively or additionally, accessory I/O interface 214 can include a wireless interface (e.g., Bluetooth or the like).

In some embodiments, PMD 202 can also use accessory I/O interface 214 to communicate with a host computer (not explicitly shown) that executes a media asset management program (such as the iTunes® media asset management program distributed by Apple Inc.). The media asset management program can enable a user to add media assets 207 to PMD 202 and/or remove media assets from PMD 202.

Accessory 220 includes controller 224, user interface 222, PMD I/O interface 226, audio parameters data store 228, and speaker driver 230. Controller 224 can include e.g., a microprocessor or microcontroller executing program code to perform various functions such as digital audio decoding, analog or digital audio processing, and the like. User interface 222 may include input controls such as a touch pad, touch screen, scroll wheel, click wheel, dial, button, keypad, microphone, or the like, as well as output devices such as video screen, indicator lights, or the like, together with supporting electronics (e.g., digital-to-analog or analog-to-digital converters, signal processors or the like). A user can operate the various input controls of user interface 222 to invoke the functionality of accessory 220 and can view and/or hear output from accessory 220 via user interface 222. In addition, a user can operate PMD 202 via user interface 222.

PMD I/O interface 226 can allow accessory 220 to communicate with PMD 202 (or another PMD). PMD I/O interface 226 can receive digital audio data from PMD 202 as well as exchanging commands with PMD 202 as described below. For example, PMD I/O interface 226 can incorporate a USB audio interface.

Audio parameter data store 228, which can be implemented using nonvolatile memory, disk or the like, provides storage for various information including parameters related to audio processing latency. These parameters may include parameters that depend in part on characteristics of a digital audio input, such as the sample rate or digital audio data format; parameters that depend in part on audio processing settings of accessory 220, such as equalizer settings that may be controlled via user interface 222; and parameters that are essentially fixed, such as a latency associated with a digital audio input buffer of accessory 220. Accordingly, audio parameter data store 228 may include lookup tables for audio processing latencies associated with various aspects of audio processing. The audio latency values stored in data store 228 may be determined, e.g., by testing and/or simulating the performance of accessory 220 during design or manufacture. In some embodiments, controller 224 is capable of looking up relevant audio processing latency parameters associated with a particular digital audio input and combining these parameters into a single value characterizing total audio propagation latency through accessory 220.

Speaker driver 230 provides the capability to drive one or more speakers to produce sound. The speakers (not explicitly shown in FIG. 2) may be external to accessory 220 or integrated with it. In one embodiment, controller 224 can receive digital audio signals from PMD 202 via PMD I/O interface 226, process the signals (e.g., decoding, applying equalization parameters, etc.), and provide the processed signals to speaker driver 230. Speaker driver 230 or controller 224 can include a digital-to-analog converter to provide analog signals to the speakers.

Accessory 220 can be any accessory capable of converting digital audio to an analog signal for producing sound via internal or external speakers. In one embodiment, PMD I/O interface 226 includes a 30-pin connector that mates with the connector used on iPod™ products manufactured and sold by Apple Inc. PMD I/O interface 226 can also include other types of connectors, e.g., USB or FireWire connectors. Alternatively, PMD I/O interface 226 can include a wireless interface (e.g., Bluetooth or the like).

It will be appreciated that the system configurations and components described herein are illustrative and that variations and modifications are possible. The PMD and/or accessory may have other capabilities not specifically described herein.

PMD/Accessory Communication Protocol

Accessory I/O interface 214 of PMD 202 and PMD I/O interface 226 of accessory 220 allow PMD 202 to be connected to accessory 220. As used herein, PMD 202 and accessory 220 are "connected" whenever a communication channel between accessory I/O interface 214 and PMD I/O interface 226 is open. Connection can be achieved by physical attachment (e.g., between respective mating connectors of PMD 202 and accessory 220), by an indirect connection such as a cable, or by establishing a wireless communication channel. Thus, a variety of communication channels may be used, including wired channels such as USB, FireWire, or universal asynchronous receiver/transmitter ("UART"), or wireless channels such as Bluetooth.

Regardless of the particular communication channel, as long as PMD 202 and accessory 220 are connected to each other, the devices can communicate by exchanging commands and data according to a PMD interface protocol. The PMD interface protocol defines a format for sending messages between PMD 202 and accessory 220. For instance, the protocol may specify that each message is sent in a packet with a header and an optional payload. The header provides basic information (e.g., a start indicator, length of the packet, and a command to be processed by the recipient), while the payload provides any data associated with the command; the amount of associated data can be different for different commands, and some commands may provide for variable-length payloads. In some embodiments, the commands may be defined such that a particular command is valid in only one direction. The packet can also include error-detection or error-correction codes as known in the art.

The PMD interface protocol can define a number of "lingoes," where a "lingo" is a group of related commands that can be supported (or unsupported) by various classes of accessories. In one embodiment, a command can be uniquely identified by a first byte identifying the lingo to which the command belongs and a second byte identifying the particular command within the lingo. Other command structures may also be used. It is not required that all accessories, or all PMDs to which an accessory can be connected, support every lingo defined within the protocol.

In some embodiments, every accessory 220 and every PMD 202 that are designed to be interoperable with each other support at least a "general" lingo that includes commands common to all such devices. The general lingo can include commands enabling the PMD and the accessory to identify and authenticate themselves to each other and to provide general information about their respective capabilities, including which (if any) other lingoes each supports. The general lingo can also include authentication commands that the PMD can use to verify the purported identity and capabilities of the accessory (or vice versa), and the accessory (or PMD) may be blocked from invoking certain commands or lingoes if the authentication is unsuccessful.

A command protocol supported by PMD 202 and accessory 220 can include a "digital audio" lingo (or other group of commands) that can be used to communicate commands and data related to providing digital audio data from PMD 202 to accessory 220. The digital audio lingo can include commands that PMD 202 can send to accessory 220 to provide information about the digital audio data to be sent (e.g., sample rate, sound energy normalization parameters, equalization parameters, etc.); an example is described in above-referenced U.S. patent application Ser. No. 11/768,897. The digital audio lingo can also include commands that accessory 220 can send to PMD 202 to provide information about its digital audio processing capabilities, such as one or more audio latency parameters as described below. The digital audio data itself can be provided by a protocol separate from the command protocol. For example, in one embodiment, PMD 202 and accessory 220 use a USB interface that can be configured in an "HID/audio" configuration. In this configuration, PMD 202 supports both the human interface device ("HID") and audio classes as defined in the USB specification. Thus, PMD 202 in HID/audio configuration can exchange packets containing commands and associated data with an accessory 220, with the commands and data conforming to the PMD interface protocol, and can also stream digital audio to accessory 220, with the digital audio stream conforming to the USB audio specifications.

Digital Audio Commands

In one embodiment, the digital audio lingo can include at least the following commands:

(1) A SetSampleRate command that can be sent by PMD 202 to accessory 220. This command is used to notify accessory 220 of the sample rate that PMD 202 will use to deliver the digital audio data for a track. In some embodiments, additional commands may be used to notify accessory 220 of other parameters related to the digital audio transmission, such as sound energy normalization, volume parameters, equalizer parameters, etc.

(2) A GetValsVideoDelay command that can be sent by PMD 202 to accessory 220 to request information about the audio latency parameters from accessory 220. In one embodiment, PMD 202 can simply request a total audio processing latency. In another embodiment, a number of different audio latency parameters may be requested, e.g., using a bitmask included as a parameter of the GetValsVideoDelay command. Examples of parameters that may be separately requested include buffer latency (or buffer size, from which latency can be determined), decoder latency, and equalizer latency. PMD 202 can use the returned parameters to determine a video delay time as described below.

(3) A SetValsVideoDelay command that can be sent by accessory 220 to PMD 202 to provide audio latency information. In one embodiment, accessory 220 can return a single value corresponding to the total audio processing latency through accessory 220. In another embodiment, accessory 220 can provide one or more specific audio latency parameters, e.g., any of the parameters listed above. The latency parameters can be expressed, e.g., in units of time (such as microseconds), or in other formats. For instance, in some embodiments, a buffer latency can be provided by returning the size (in bytes or kilobytes or the like) of an input buffer of accessory 220, from which PMD 202 can infer a buffer latency. The SetValsVideoDelay command can be sent in response to a GetValsVideoDelay command from PMD 202, or accessory 220 can send the command whenever it detects a change in audio parameters that would affect the audio latency.

It is to be understood that the digital audio lingo may include other commands in addition to or instead of those described herein. For example, commands pertaining to determining a sample rate for delivery of digital audio data to an accessory, as described in above-referenced U.S. patent application Ser. No. 11/768,897, can also be included.

Audio/Video Synchronization

During playback of an audio/video track, PMD 202 can send the digital audio portion of the track to accessory 202 and display the video portion of the track on its own display device. PMD 202 can use the audio latency information obtained via the SetValsVideoDelay command to determine an amount of time to delay displaying the video portion of the track after sending the audio portion so as to provide synchronized images and sound to the user. Accordingly, PMD 202 may produce an isochronous user experience for the combination of the video presentation on PMD 202 and the audio presentation on accessory 220.

Figure 3:
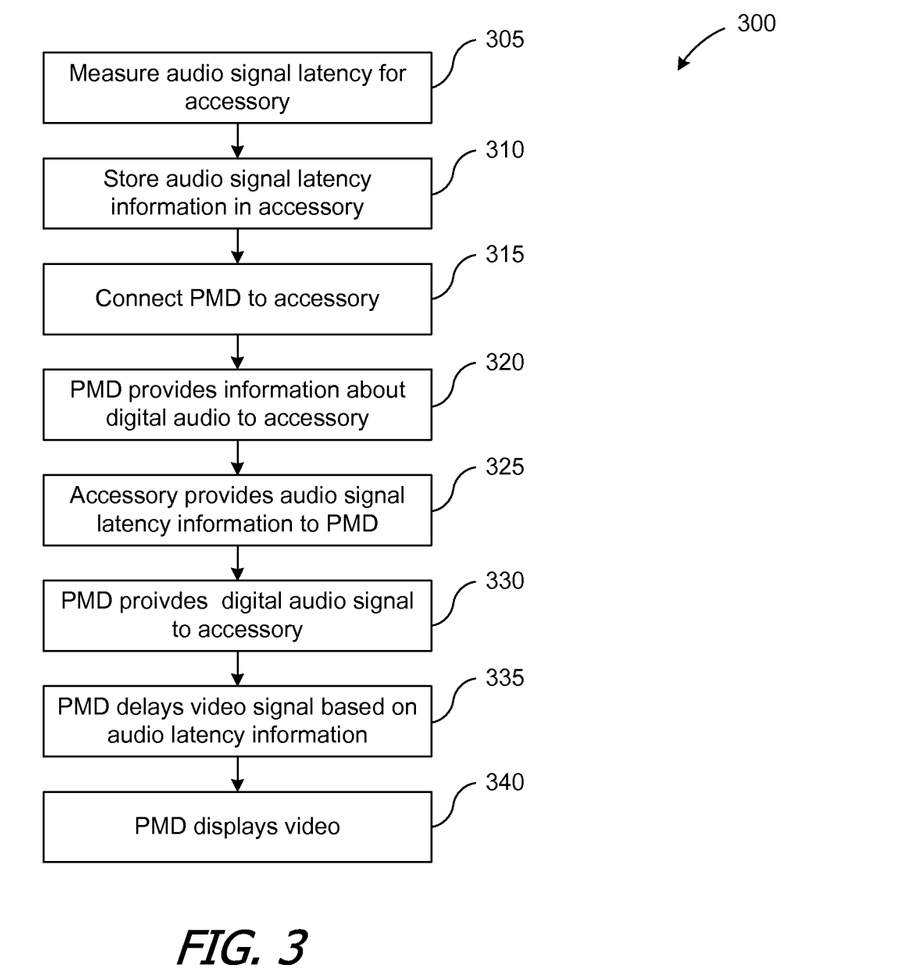
FIG. 3 is a flow diagram of a process for providing synchronized audio and video portions of an audio/video track according to an embodiment of the present invention.

FIG. 3 is a flow diagram of a process for providing synchronized audio and video portions of an audio/video track according to an embodiment of the present invention. An audio signal latency through some portion (or all) of the data path of an accessory (e.g., accessory 110 of FIG. 1 or accessory 220 of FIG. 2) at a particular playback sample rate may be determined (step 305).

Audio signal latency can be determined in various ways. For example, measurement of audio signal propagation times can be performed, e.g., by a manufacturer of the accessory, during design and/or testing of the accessory or components thereof. The measurement result can be hard coded as a constant in the software (or firmware) that controls the accessory. Alternatively, audio signal latency can be calculated, extracted from circuit simulations, or determined using a combination of measurements, calculations, simulations, and/or other techniques.

In some embodiments, only the total audio signal latency (from digital audio input to speaker output) is determined. Total audio signal latency can be determined from any combination of measurement, simulation, calculation, and/or other techniques. The total audio signal latency may depend, e.g., on sample rate and/or internal signal processing settings (such as equalizer settings) of the accessory. Thus, even where only total audio signal latency is determined, multiple latency values, each applicable to a different set of operating conditions, may be determined at step 305. In other embodiments, multiple components of audio signal latency, such as buffer latency, decoder latency, equalizer latency, and the like, can be separately determined (e.g., through measurement, circuit simulation, calculation, etc.); to the extent that a given component of audio signal latency depends on sample rate and/or internal signal processing settings of the accessory, multiple values of that component may be determined.

Regardless of how the audio signal latency is determined or the number of latency values determined, the audio signal latency information may be stored (step 310), e.g. in audio parameter data store 228. For example, total audio latency for different conditions can be stored in a lookup table (or similar data structure) indexed by sampling rate, equalizer settings, and/or other variable operating conditions. Components of total audio latency, such as buffer latency, decoder latency, equalizer latency, and the like, can also be separately stored; components that depend on sample rate and/or internal processing settings can have multiple values stored in a lookup table indexed by the relevant factor(s).

Thereafter, a PMD (e.g., PMD 105 of FIG. 1 or PMD 202 of FIG. 2) may be connected to the accessory (step 315). At step 320, the PMD can provide information about a digital audio signal to the accessory, e.g., using the SetSampleRate command described above. The information can include, e.g., the sample rate at which the digital audio signal will be delivered to the accessory; other information about the digital audio signal can also be included as desired.

At step 325, the accessory can provide audio latency information to the PMD, e.g., using the SetValsVideoDelay command described above. In one embodiment, the audio latency information can be sent in response to an explicit request from the PMD (e.g., using the GetValsVideoDelay command described above); in another embodiment, the audio latency information can be sent automatically in response to the SetSampleRate command. As noted above, the magnitude of audio latency may be dependent on the audio sample rate, and step 325 can include accessing lookup tables using the sample rate provided by the PMD, computing a total audio latency, or other operations.

At step 330, the PMD can begin to stream the digital audio data to the accessory as a digital audio signal, using the sample rate specified at step 320. At step 335, the PMD can delay the video signal by an amount of time determined from the audio latency information provided by the accessory. In one embodiment, the accessory provides a total audio latency (e.g., in microseconds), and the PMD simply delays the video signal by that amount of time. In another embodiment, the PMD can compute a delay time for the video signal from the audio latency information provided by the accessory. After the video delay time has elapsed, the PMD can begin the video portion of the presentation, displaying the video signal (step 340).

It will be appreciated that process 300 is illustrative and that variations and modifications are possible. Steps described as sequential may be executed in parallel, order of steps may be varied, and steps may be modified or combined. In some embodiments, the accessory can provide the audio latency information without waiting for a request from the PMD. For example, in some embodiments, any time the audio sample rate changes, the accessory may send a SetValsVideoDelay command to the PMD, providing updated audio latency information corresponding to the new audio sample rate. As another example, in some embodiments, the audio latency of an accessory may be affected by settings within the accessory, such as equalizer settings, that a user can change at any time, including during playing of a track. In such embodiments, in response to the user changing a setting that affects audio latency, the accessory can send another SetValsVideoDelay command to the PMD, providing updated audio latency information corresponding to the changed setting. The PMD can adjust the video delay in real time to maintain audio/video synchronization.

As noted above, in some embodiments, audio latency information is provided to the PMD using multiple parameters associated with the SetValsVideoDelay command (e.g., propagation delay and buffer size), and the PMD determines the video delay time from these parameters. In other embodiments, the audio latency information can be provided as a single parameter that takes into account all sources of audio latency within the accessory.

Figure 4:
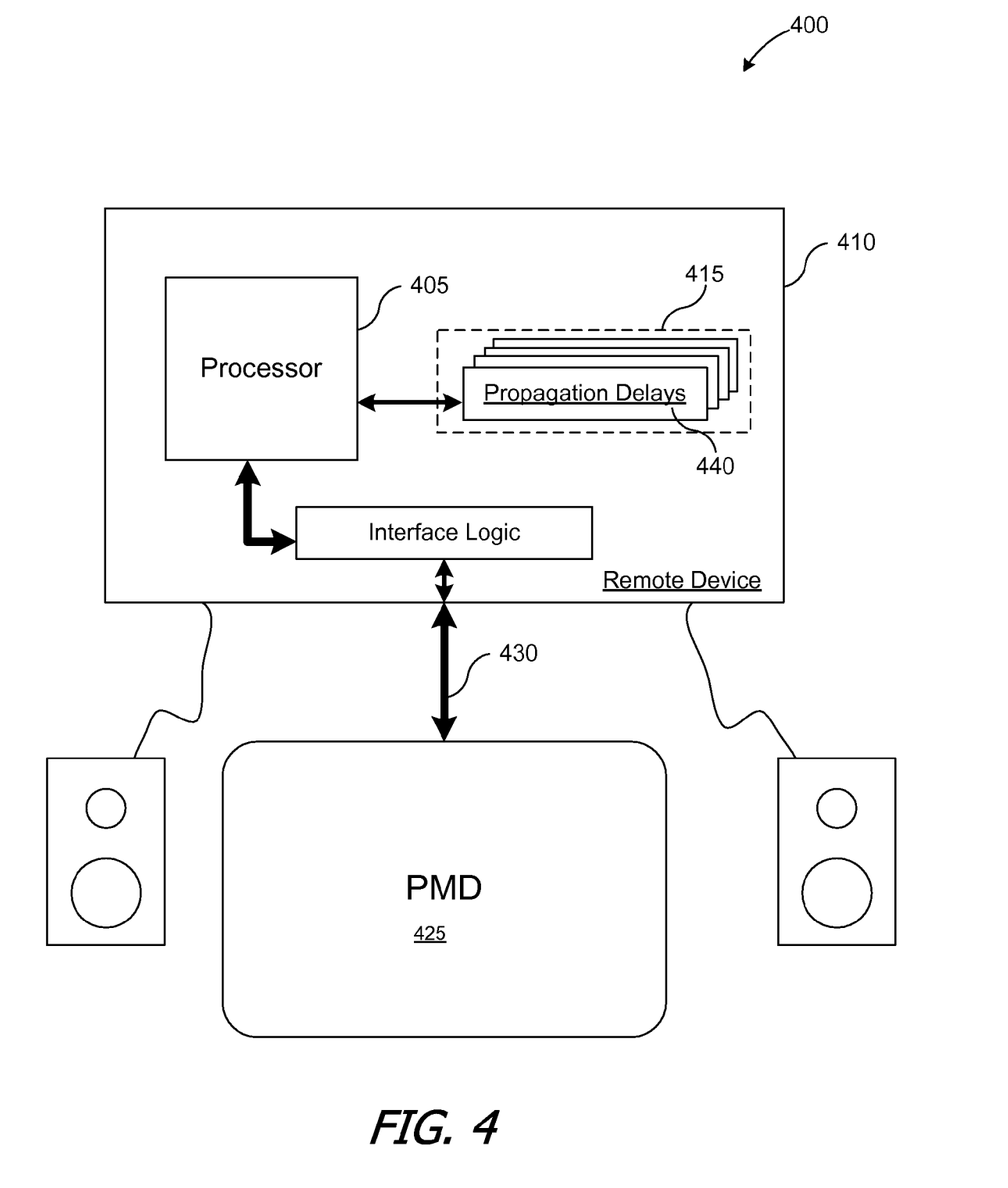
FIG. 4 is a block diagram of an audio/video presentation system 400 according to another embodiment of the present invention.

Referring to FIG. 4, there is shown an audio/video presentation system 400 according to another embodiment of the present invention. System 400 can include PMD 425 and accessory (remote device) 410. Processor 405 can reside in accessory 410, and data register 415 can reside within processor 405 or elsewhere within accessory 410. A set of audio signal propagation latencies (or delays) 440 through accessory 410 can be determined (e.g., by a manufacturer of accessory 410) and stored in data register 415. Remote device 410 can be coupled to PMD 425, e.g., through interface bus 430. System 400 can implement process 300 described above or similar processes.

While the invention has been described with respect to specific embodiments, one skilled in the art will recognize that numerous modifications are possible. Thus, although the invention has been described with respect to specific embodiments, it will be appreciated that the invention is intended to cover all modifications and equivalents within the scope of the following claims.

What is claimed is:

1. A method of presenting an audio/video track using a portable media device and an accessory device, the method comprising, by the portable media device:
   receiving from the accessory device audio latency information;
   determining a video delay time based on the audio latency information;
   sending digital audio data to the accessory, the digital audio data corresponding to an audio portion of the audio/video track;
   providing an analog video signal to a video display, the analog video signal corresponding to a video portion of the audio/video track,
   delaying the analog video signal relative to the digital audio signal, wherein the video signal is delayed by determined amount of video delay time; and
   displaying the analog video signal after the video delay time has elapsed, wherein the video signal is synchronized with audio data presented by the accessory.

2. The method of claim 1 wherein the video display is a component of the portable media device.

3. The method of claim 1 further comprising: sending to the accessory sample rate information indicating a sample rate to be used for providing the digital audio data.

4. The method of claim 1, wherein the audio latency information is received via a serial interface.

5. The method of claim 1, wherein the digital audio data is sent to the accessory using a Universal Serial Bus ("USB") audio protocol.

6. The method of claim 3 wherein the accessory sends the audio latency information in response to the sample rate information.

7. A portable media device for use with an accessory, the portable media device comprising:
   a display configured to display an analog video signal;
   an interface configured to communicate with an accessory, the interface being configured to send a digital audio signal to the accessory and further configured to exchange with the accessory device commands and information related to the presentation of digital audio data; and
   a processor coupled to the interface and to the display, the processor being configured to:
   receive a first command from the accessory via the interface, the first command providing to the portable media device audio latency information corresponding to a latency characteristic of the accessory;
   determine an amount of video delay time for a video portion of an audio/video track based on the audio latency information;
   send digital audio data for an audio portion of the audio/video track to the accessory via the interface;
   delay the analog video portion of the audio/video track relative to the digital audio data, wherein the video portion of the audio/video track is delayed by the determined amount of video delay time; and
   displaying the analog video signal after the video delay time has elapsed, wherein the video signal is synchronized with audio data presented by the accessory.

8. The portable media device of claim 7 wherein the processor is further configured to send a second command to the accessory via the interface, the second command including a sample rate for digital audio data to be sent by the portable media device.

9. The portable media device of claim 7 wherein the interface is configured to send digital audio data according to a Universal Serial Bus ("USB") audio protocol.

10. The portable media device of claim 8 wherein the first command is received in response to sending the second command.

11. A computer-implemented method, comprising:
    sending, by a portable media device, a command to request audio latency information from an accessory;
    receiving, by the portable media device, a command from the accessory including audio latency information,
    determining, by the portable media device, an amount of video delay time based on the audio latency information;
    sending digital audio data to the accessory, the digital audio data corresponding to an audio portion of the audio/video track;
    providing an analog video signal to a video display, the analog video signal corresponding to a video portion of the audio/video track,
    delaying the analog video signal relative to the digital audio signal, wherein the video signal is delayed by the determined amount of video delay time; and
    displaying the analog video signal after the video delay time has elapsed, wherein the video signal is synchronized with audio data presented by the accessory.

12. The method of claim 11, wherein the command to request audio latency information includes a request for a plurality of audio latency parameters.

13. The method of claim 11, further comprising sending, from the portable media device to the accessory, a command including sample rate information.

14. The method of claim 12, wherein the audio latency parameters include at least one of a buffer latency, a decoder latency, and an equalizer latency.

15. The method of claim 13 wherein the accessory sends the command including the audio latency information in response to the command including sample rate information.

16. The method of claim 13 wherein the sample rate information includes the sample rate at which audio will be delivered from the portable media device to the accessory.

* * * * *

UNITED STATES PATENT AND TRADEMARK OFFICE
CERTIFICATE OF CORRECTION

PATENT NO.       : 9,467,735 B2
APPLICATION NO.  : 12/138788
DATED            : October 11, 2016
INVENTOR(S)      : Holden et al.

Page 1 of 1

It is certified that error appears in the above-identified patent and that said Letters Patent is hereby corrected as shown below:

In the claims

Claim 1, Column 11, line 20: Delete "a" and insert --an amount of--.

Claim 1, Column 11, line 29: Insert --the-- after by.

Signed and Sealed this
Twentieth Day of December, 2016

Michelle K. Lee
*Director of the United States Patent and Trademark Office*